July 1, 1924.
M. HOUDAILLE
LIQUID SHOCK ABSORBER
Filed June 28, 1921    2 Sheets-Sheet 1
1,499,660
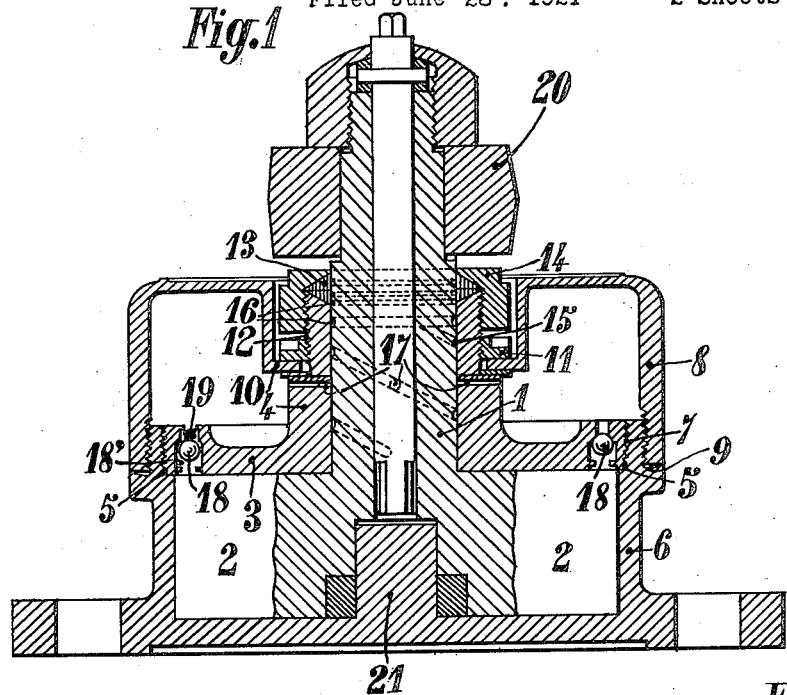
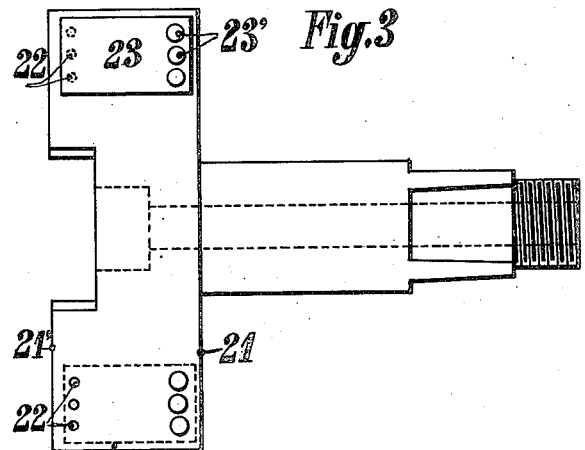
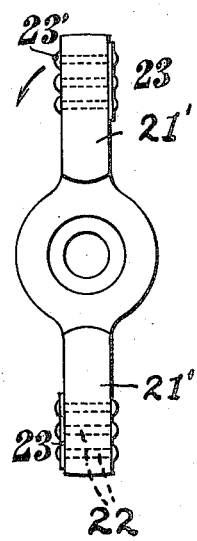
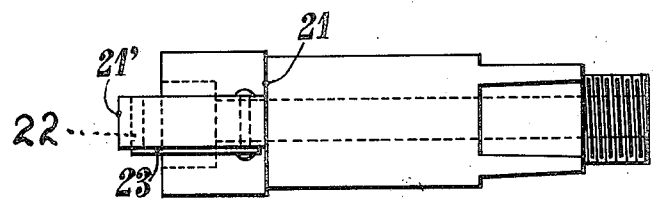
Inventor,
M. Houdaille
By Marks&Clerk
Attys

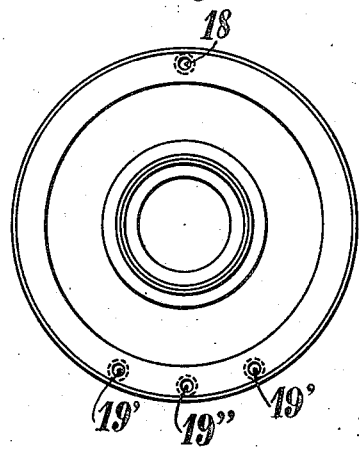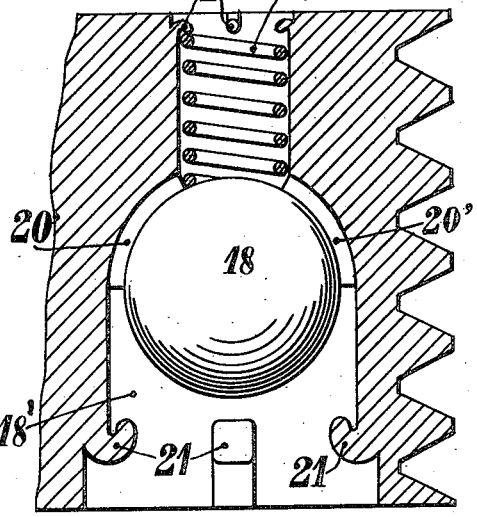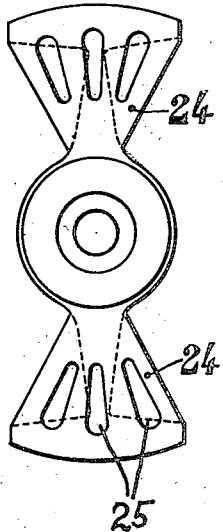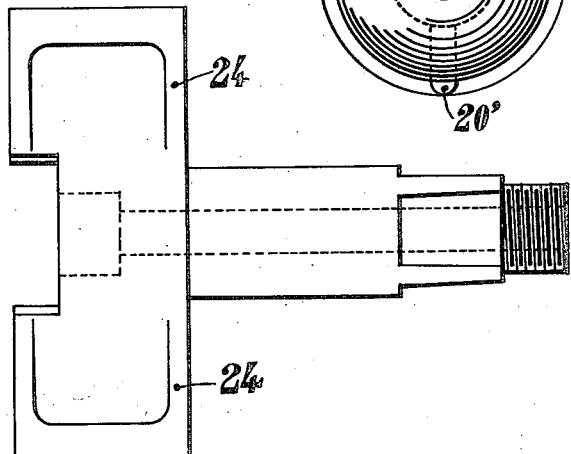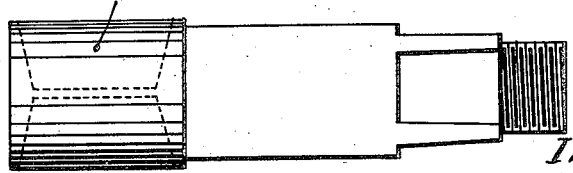

Patented July 1, 1924.

1,499,660

UNITED STATES PATENT OFFICE.

MAURICE HOUDAILLE, OF LEVALLOIS-PERRET, FRANCE.

LIQUID SHOCK ABSORBER.

Application filed June 28, 1921. Serial No. 481,155.

*To all whom it may concern:*

Be it known that I, MAURICE HOUDAILLE, citizen of the French Republic, residing at Levallois-Perret, France, have invented certain new and useful Improvements in Liquid Shock Absorbers, of which the following is a specification.

The invention has for its object improvements in liquid shock-absorbers operating by circulation of liquid the braking of which results from the resistance it encounters when passing through calibrated orifices.

These improvements more particularly relate to:

1°—the arrangement of the stuffing-box insulating the shock-absorbing liquid from the exterior, 2°—the centering of the members guiding the axis of the damping blades and the lubrication of this axis in its bearing, 3°—the device of recovery of the shock-absorbing liquid after it has lubricated the friction parts, 4°—the arrangement of the air exhaust valve, 5°—the arrangement of compensating valves for the shock-absorbing or damping liquid, 6°—the arrangement on the movable braking members or on the fixed partitions limiting the work-chambers, of safety valves allowing the suppression of the super-pressures and tending to uniformly distribute on each blade the total braking stress.

7°—the arrangement of ribbed-shoes for guiding the blades.

The accompanying drawing shows, by way of examples, various forms of carrying out the improvements forming the subject-matter of this invention.

Fig. 1 is a vertical section of the improved shock-absorber.

Fig. 2 is a plan view of the closing cover for the damping chamber.

Figs. 3, 4 and 5 are respectively an elevation, a plan view and a side view of the braking blades provided with safety flap valves.

Figs. 6 and 7 respectively show, on an enlarged scale, a cross section and a corresponding plan view of the cover at the level of the air exhaust valve.

Figs. 8, 9 and 10 are respectively an elevation, a plan view and a side view of the blades with guide ribbed-shoes.

In order to have a perfect contact of the driving axis 1 of the braking blades 2—2, the closing cover 3 of the damping chamber, in the central socket 4 of which this axis 1 is guided, is provided with a cylindrical bearing 5 which centers itself on the corresponding bore of the box or casing 6. The screw thread 7 serves simply to lock the cover 3 on its seat.

The compensating tank 8 is screwed on the peripheral screw threaded part of the box 6 on the seat of which it is locked with interposition of a tight joint 9.

The tank 8 has at its central part a cup or bowl on the bottom 10 of which bears a washer-nut 11 screwed on the outer screw thread 12 of the guide socket 4. A tight washer is interposed between the bottom 10 and the base of the socket 4.

The tightness of the axis 1 at the place where it extends outside the apparatus is obtained by two leather washers 13 of triangular section, one of which is arranged in a bore of corresponding shape of the socket 4, at the end of the latter, and the other in the stuffing-box gland constituted by a hollow nut 14 screwed through its inner screw thread on the screw thread 12 of the socket 4.

The axis 1 is thus perfectly guided throughout its length in the smooth bearing constituted by the inner bore of the socket 4.

This axis is provided, on its periphery, with oil-grooves 15 in the form of helical grooves in which the damping liquid enters under pressures developed in the work-chambers. Adjacent to the leather packing 13, the shaft 1 is provided with parallel grooves 16 which constitute barriers for the oil tending to flow outside.

For allowing the return to the compensating chamber of the lubricating liquid, one or more orifices 17 are provided through the socket 4 and put the helical grooves 15 in communication with the compensating chamber.

By means of the above described arrangements, the centering of the shaft 1 and blades 2, 2, is ensured with precision. The stuffing-box gland 14 can be adjusted from the exterior and the tightness of the apparatus is absolute.

The improvements in the valves ensuring communication between the work-chambers and the compensating chamber are the following: The air exhaust valve 18 which is arranged at the upper part of the apparatus, when the latter is in operation, is constituted by a ball brought back to open position by a coil spring 19 held in place by claws 20'' obtained by caulking of the edges of the orifice of the conduit $18^1$ opening in the compensating chamber. Similar claws 21 obtained by caulking of the edges of the conduit $18^1$ opening in the work-chamber constitute an abutment for the ball 18.

The latter bears, during the compression phase, on a spherical seat on the periphery of which are provided capillary channels $20^1$ permitting (when the valve is closed) the air to pass in the compensating chamber, but preventing the passage of the damping liquid.

The function of the spring 19 is to facilitate the raising of the valve from its seat principally during the period of rest and further when working during the period of partial vacuum.

The coil spring may be replaced by any other member facilitating the raising of the ball from its seat, for instance a small resilient blade bearing on this ball.

In order to facilitate the rapid and continuous reentrance of the liquid coming from the compensating chamber 8 into the work-chamber for compensating therein the losses of liquid which took place through various causes (evaporation, lubrication, etc.) a plurality of compensating valves (for instance two ball valves $19^1$) are arranged on opposite sides of the lower valve 19''. By means of this arrangement even for small oscillations of the blades 2—2, the re-entrance of the compensating liquid is always ensured, a plurality of compensating valves (two in the example shown in the accompanying drawing) are always uncovered by the thickness of the shutter.

Moreover, this arrangement permits to fill up very rapidly the apparatus by reducing the number of necessary oscillations to be imparted to the lever 20.

If, for any cause whatever, in particular tardy filling up of the apparatus by the user, the braking stress is unequally distributed between the two blades 2, 2, the overloaded blade will support exaggerated stresses. For the purpose of improving the working conditions of the blades 2, conduits 22 are provided in the latter, which conduits ensure intercommunication between the work-chambers.

These conduits 22 are normally closed by resilient blades 23 secured on paddles or vanes by means of rivets $23^1$ for instance, and which are arranged as shown in Fig. 4, for the direction of rotation of the paddles indicated by the arrow. When the thrust on one of the paddles exceeds a predetermined value, the resilient or spring blades 23 the characteristics of manufacture of which are chosen accordingly, uncover the orifices 22 and close them again when the thrust on the said overloaded paddle has taken back its normal value.

$21^1$ designates the portions of the blades which bear against the bottom of the casing 6, while 21 indicates the portions of the blades which engage the cover 3.

The ball valve suppresses any super-pressure on the paddles and improves the distribution of the braking stresses in the two work-chambers. It is to be understood that these intercommunicating conduits, controlled by weighted ball valves, between the work chambers, may be provided in the separating partitions as well as in the movable paddles. These weighted valves may be of any suitable arrangement.

Figs. 8, 9 and 10 illustrate a special form of paddles or vanes. The latter are provided on their peripheral and side faces with ribbed-shoes 24 ensuring a greater guiding surface or bearing on the walls of the work chambers and consequently a better guiding action. The guide surfaces may be provided with grooves 25 for stopping the oil, constituting at the same time oil grooves and avoiding any incidental communication between the chambers located on opposite sides of one and the same paddle or vane.

The above arrangements are given by way of example only; the forms, materials, dimensions, accessories and applications may be varied according to circumstances without departing thereby from the principle of the invention.

What I claim as my invention and desire to secure by Letters Patent is:

1. In combination, a casing forming a working chamber, a cover member for said chamber having an elongated hollow boss, a shaft member extending through said boss and provided with blades operating in said working chamber, means cooperating with said shaft member and boss to prevent oil from the working chamber reaching the exterior, oil conduits provided in said boss, one of said members being provided with grooves communicating with said conduits, and a second casing forming a compensating chamber adapted to receive oil from said conduits.

2. In combination, a casing forming a working chamber, a cover member for said chamber having an elongated hollow boss, a shaft member extending through said boss and provided with blades operating in said working chamber, means cooperating with said shaft member and boss to prevent oil from the working chamber reaching the exterior, a second casing forming a compensating chamber, an air exhaust valve arranged at the upper part of the work chamber, said valve including a ball cooperating with a spherical seat, said seat having capillary channels adapted to permit the passage of air past the ball when the latter is occupying its seat but preventing the passage of liquid, and resilient means engaging said ball and adapted during the period of partial vacuum or during the period of rest to force the ball away from its seat.

3. In combination, a casing forming a working chamber, a cover member for said chamber having an elongated hollow boss, a shaft member extending through said boss and provided with blades operating in said working chamber, means cooperating with said shaft member and boss to prevent oil from the working chamber reaching the exterior, a second casing forming a compensating chamber, a plurality of passageways formed in the cover and adapted to place said compensating chamber and the working chamber in communication, semi-spherical valve seats arranged in said passageways, and ball valves arranged in the passageways and cooperating with said seats, said valves including a main one and a plurality of compensating ones arranged on opposite sides of the main one, said compensating valves being so spaced as to be always uncovered for any position of the blades, each of said balls being adapted to bear on its semi-spherical air and fluid tight seat during the compression period, and abutments adapted to receive the pressure of the valves during the period of partial vacuum.

4. In combination, a casing forming a working chamber, a cover member for said chamber having an elongated hollow boss, a shaft member extending through said boss and provided with blades operating in said working chamber, means cooperating with said shaft member and boss to prevent oil from the working chamber reaching the exterior, and automatically opening and closing flap valves adapted to suppress the super-pressures and tending to uniformly distribute the braking stress on each blade, each of said valves consisting of a resilient flap.

5. In combination, a casing forming a working chamber, a cover member for said chamber having an elongated hollow boss, a shaft member extending through said boss and provided with blades operating in said working chamber, means cooperating with said shaft member and boss to prevent oil from the working chamber reaching the exterior, and guide rib shoes on the peripheral and side friction faces of said blades, said shoes being provided with grooves adapted to receive oil.

6. In combination, a casing forming a working chamber, a cover for said chamber provided with an elongated hollow boss extending in a direction away from the chamber, a shaft journaled in said boss and cover and provided with blades arranged within the working chamber, a second casing forming with the cover a compensating chamber, an air passageway arranged in said cover and adapted to permit the passage of air from the working chamber to the compensating chamber and vice versa, a valve cooperating with said passageway and permitting the passage of air but preventing the passage of liquid, a second passageway arranged at a position in the cover substantially diametrically opposed to the position of the first mentioned passageway, a valve for tightly closing the second passageway and provided with means for normally forcing the same away from the seat, compensating valve passageways arranged on opposite sides of the second passageway, and valves for controlling the passage of fluid through the compensating passageways.

7. In combination, a casing forming a working chamber adapted to contain a braking liquid, a cover for said chamber provided with an elongated hollow boss extending in a direction away from said chamber, a shaft journaled in said boss, blades fixed to said shaft and arranged within the working chamber, a second casing secured to the first casing and cooperating with said cover to form a compensating chamber, valve controlled passageways placing the compensating chamber and working chamber in communication, and a stuffing box cooperating with said boss and shaft to prevent the leakage of oil outwardly along said shaft.

8. A combination as claimed in claim 7 in which the shaft is provided with parallel oil grooves arranged adjacent to said stuffing box.

9. A combination as claimed in claim 7 in which the shaft is provided with helical oil grooves, and conduits arranged in said boss for feeding oil from said grooves to the compensating chamber.

In testimony whereof I have affixed my signature.

MAURICE HOUDAILLE.